2,818,371

FLUORIDE-CONTAINING DENTIFRICES

George D. Wessinger, Delmar, N. Y., assignor to Sterling Drug Inc., New York, N. Y.

No Drawing. Application October 26, 1953
Serial No. 388,453

9 Claims. (Cl. 167—93)

This invention relates to therapeutic dentifrices containing fluorine in the readily available form of a water-soluble, inorganic fluoride as an essential fluoridizing ingredient and microcrystalline aluminum hydroxide as an essential cleansing and polishing agent.

For some time now it has been known that the average incidence of dental caries is less in individuals who have lived in areas where drinking water supplies contain fluorine in the form of fluoride ion during the period when their teeth are developing. With this knowledge, researchers in the field of dental therapeutics have endeavored to formulate oral preparations containing fluorides that would prevent or decrease caries prevalence in humans. Success towards this end has been limited to aqueous solutions containing small quantities of sodium fluoride or some other inorganic fluoride and to tablets or wafers containing calcium fluoride.

Numerous efforts, dating back to over a decade ago, have been made, but without success, to find satisfactory dentifrice preparations containing fluorine. A number of dentifrices containing inorganic fluorides, notably sodium fluoride and calcium fluoride, have been reported, however none have ever been deemed satisfactory enough to be used by dentists or by the public. Apparently, these dentifrices have not been satisfactory because they contained fluoride ion in a poorly available form. Those having calcium fluoride as the source of fluorine are unsatisfactory because this fluoride salt is extremely water-insoluble, in fact, less soluble than tooth enamel. Thus, the fluorine of calcium fluoride is not available to exert any appreciable beneficial effect on tooth enamel. Other heretofore known fluoride-containing dentifrices have had water-soluble sodium fluoride as the source of fluorine, however, most of these were unsatisfactory because they also contained as an abrasive some calcium salt, such as calcium carbonate, calcium phosphate, etc., which in the presence of water, i. e., when the dentifrice is being used, would react with the sodium fluoride to form the highly water-insoluble calcium fluoride, thereby greatly reducing the concentration of fluoride ion available for coaction with tooth enamel.

An object of this invention therefore is to provide improved therapeutic dentifrices having incorporated fluorine in a form that is readily available for coaction with dental enamel.

My new fluoride-containing dentifrice having fluorine in readily available form comprises a water-soluble, inorganic fluoride, such as sodium fluoride, stannous fluoride or potassium fluoride, as the essential fluoridizing agent and microcrystalline aluminum hydroxide as the essential cleansing and polishing agent. The preferred compositions contain from 0.1 to 2% of the water-soluble inorganic fluoride. The compositions having a fluorine content near the lower limit are adapted for daily prophylactic use by the consumer, while the compositions having a fluoride content near the upper limit are adapted for occasional therapeutic application to the patient by a dentist or dental hygienist. My formulations have the distinct advantage over prior fluoride-containing dentifrices in having fluorine in a readily available form during use to act on tooth enamel in preventing or reducing dental caries.

The essential cleansing and polishing agent of my preparations, namely, microcrystalline aluminum hydroxide, the particle size of which is largely or substantially sub-microscopic, and mainly in the range of 0.25–0.5 micron, has been described in detail in U. S. Patent 2,550,207, issued April 24, 1951. This microcrystalline aluminum hydroxide, which leaves the teeth with an excellent luster and polish in addition to cleaning them, has a mean particle size below approximately 0.3 micron and has a distribution such that 5–10% of the particles are larger than 0.5 micron. The quantity of microcrystalline aluminum hydroxide of my preparations range from about 25–95% by weight depending on the type of formulation. For instance, in liquid preparation I use about 25–30% microcrystalline aluminum hydroxide; in powders, about 90–95%; and in pastes, about 25–50%.

In order to provide a preparation with greater cleansing action for some types of teeth that are difficult to clean, a minor quantity of the microcrystalline aluminum hydroxide, say about 5–20%, can be replaced by a supplementary cleansing agent of larger particle size that does not coact with the water-soluble inorganic fluoride to decrease the concentration of available fluoride ion. Such cleansing agents suitable for this purpose in my preparations are those preferably having a particle size of about 5–30 microns (corresponds roughly to a mesh size of 325 to 600 or finer), and, in particular, I have found alumina ($Al_2O_3$) and aluminum hydroxide of said larger particle size satisfactory. Hereinafter this aluminum hydroxide of larger particle size will be referred to as crystalline aluminum hydroxide in order to distinguish it from the already discussed micro-crystalline aluminum hydroxide which is a major and essential component of my preparations.

The microcrystalline aluminum hydroxide, with or without a minor quantity of a supplementary cleansing agent such as those described above, and the water-soluble, inorganic fluoride may be incorporated into dentifrice compositions in any suitable manner depending on whether a powder, paste or liquid preparation is to be produced. For this purpose I add appropriate proportions of surface-active agents, binders, excipients or plasticizers, flavoring materials, sweetening agents, coloring material and lubricants. By a plasticizer, I mean a liquid which when mixed with powdery constituents affords a paste such as glysterol or propylene glycol, such heavy liquids used alone or diluted with water. Other heavy paste-forming liquids as mentioned hereinbelow may be used as plasticizer. The various combinations of these ingredients may be conveniently termed dentifrice vehicles, adjuvants or bases and together with the cleansing and polishing agent, or agents, and the water-soluble, inorganic fluoride make up the dental paste, powder or liquid.

My invention is further illustrated by the following examples. All parts are by weight.

Example 1

*Tooth paste.*—The following preparation contains 2% sodium fluoride.

A mixture of 0.5 part of powdered gum tragacanth, 0.1 part of methyl para-hydroxybenzoate and 0.7 part of flavor was dispersed in 14 parts of glycerin. 2 parts of fluoride, 1.5 parts of an anionic detergent, 0.05 part of soluble saccharin and 0.01 part of color were dissolved in 30 parts of water, and this aqueous solution was added to the glycerin dispersion and mixed thoroughly. After allowing the gum to swell, there was added with stirring 14 parts of Sorbo (70% aqueous d-sorbitol solution), followed by 4 parts of alumina (325 mesh) and 25 parts of microcrystalline aluminum hydroxide. To this mixture was added approximately 9.1 parts of 10% aqueous hydrochloric acid, thereby lowering the pH to 7.3. The preparation was then adjusted to 100 parts by adding water.

*Example 2*

*Tooth powder.*—20 parts of microcrystalline aluminum hydroxide was mixed with 0.7 part of flavor. 20 parts of microcrystalline aluminum hydroxide was mixed with 4 parts of alumina (325 mesh), 0.05 part of soluble saccharin and 2 parts of sodium fluoride. The two mixtures were combined and mixed with 53.25 parts of microcrystalline aluminum hydroxide to give a total of 100 parts.

Another embodiment of my invention is obtained when, in the above preparation, 2 parts of stannous fluoride is substituted for the sodium fluoride.

*Example 3*

*Tooth paste.*—A mixture of 1 part of sodium alginate and 1.2 parts of flavor is dispersed in 15.3 parts of glycerin. 0.1 part of bis(3,5,6-trichloro-2-hydroxyphenyl)-methane was dissolved in 0.4 part of ethanol and the solution was dispersed in the glycerin mixture. 0.1 part of sodium fluoride, 0.25 part of soluble saccharin, 2.2 parts of an anionic detergent and 0.004 part of a color were dissolved in 20.3 parts of water and the solution was added to the glycerin dispersion and mixed thoroughly. After allowing this mixture to stand for about thirty minutes, 15.3 parts of Sorbo was added, followed by 5 parts of crystalline aluminum hydroxide (325 mesh) and 38.2 parts of microcrystalline aluminum hydroxide. 0.6 part of orthophosphoric acid was added to adjust the pH to 7.3.

*Example 4*

*Tooth paste.*—This preparation was formulated like that of Example 3 but using an additional 0.5 part of water in place of the bis(3,5,6-trichloro-2-hydroxyphenyl)methane and the ethanol.

*Example 5*

*Tooth powder.*—20 parts of microcrystalline aluminum hydroxide were mixed with 5 parts of crystalline aluminum hydroxide (325 mesh), 0.25 part of soluble saccharin, 2.2 parts of an anionic detergent and 0.1 part of sodium fluoride. Another 20 parts of microcrystalline aluminum hydroxide was mixed with 1.2 parts of flavor and 0.1 part of bis(3,5,6-trichloro-2-hydroxyphenyl)-methane. The two mixtures were combined and mixed with 51.15 parts of microcrystalline aluminum hydroxide to give a total of 100 parts.

*Example 6*

*Tooth powder.*—A preparation like that of Example 5 but containing no bis(3,5,6-trichloro-2-hydroxyphenyl)-methane can be prepared by substituting 0.1 part of microcrystalline aluminum hydroxide for the bis(3,5,6-trichloro-2-hydroxyphenyl)methane.

*Example 7*

*Liquid dentrifrice.*—2 parts of sodium alginate is dispersed in a solution of 0.1 part of sodium fluoride in 66 parts of water. 25 parts of microcrystalline aluminum hydroxide is dispersed in the above mixture. Sufficient parts of flavoring, detergent, color, dilute aqueous hydrochloric acid and water are added to make 100 parts of solution having a pH of 4.2.

*Example 8*

*Tooth paste.*—A formulation containing 2% stannous fluoride as the water-soluble, inorganic fluoride was prepared following the procedure given above for Example 1. The ingredients are listed as follows:

| Ingredient: | Percent by weight |
|---|---|
| Gum tragacanth | 0.75 |
| Flavor | 0.70 |
| Glycerin | 28.00 |
| Stannous fluoride | 2.00 |
| Soluble saccharin | 0.05 |
| Color | 0.002 |
| Alumina (325 mesh) | 5.00 |
| Microcrystalline aluminum hydroxide | 40.00 |
| 10% aqueous HCl q. s. to pH 4.2 | |
| Water q. s. to 100 parts | |

Various modifications can be made from the foregoing examples without departing from my invention. For instance, my preparations can be made with or without surface-active agents such as soap, sodium lauryl sulfoacetate, sodium lauryl sulfate, amine and metal salts of alkyl sulfates and sulfonated fatty alcohols, the amine and metal salts of aliphatic sulfonic acids and aliphatic-substituted aromatic sulfonic acids, the fatty acid amides of dialkylaminoalkylamines, basically substituted esters of fatty acids, and the like. Various flavoring materials may be employed, including vanillin; oil of cinnamon, clove, anise, fennel, lavender, and eucalyptus; thymol, menthol, camphor, and other terpenes. Binders, excipients and lubricants that are satisfactory in the dentrifrices that I contemplate comprise all such substances generally employed in such a manner, including gum karaya, Irish moss, gum acacia, agar-agar, salts of carboxymethyl cellulose, esters of polyhydroxy compounds such as sorbitol citrate, diethylene glycol diborate, mannitol oleate and the like, pectin, sorbitol syrup, corn starch, glycerite of starch, glycerite of sodium stearate, sodium alginate, gelatin, glycols, fatty acid esters of glycerin and glycols, mineral oil, petrolatum, alcohol and similar materials. Besides saccharin, other sweetening agents such as sugar, starch and sugar syrups, honey, dulcitol and lactose may be employed.

In preparing my paste and liquid preparations I found that best results were obtained if the pH of the preparations was kept within the range of 4.0 to 9.0, and preferably at 5.0 to 7.5 using an alkali fluoride, e. g. sodium fluoride, as the water-soluble, inorganic fluoride, and preferably at 4.0 to 5.5 using stannous fluoride.

In the foregoing description it will be understood that the formulations containing relatively high concentrations of fluoride ion, i. e., approximately 1–2%, are intended for occasional use under supervision of a dentist, whereas the compositions having low fluoride concentration, i. e., about 0.1–0.2%, are intended for daily use by the public.

This application is a continuation-in-part of my co-pending application, Serial No. 256,138, filed November 13, 1951, now abandoned.

My fluoride-containing dentifrices have been found effective in fluoridizing human teeth enamel. For example, it has been found that the fluoride uptake by the enamel surface of freshly extracted human teeth and powdered enamel was the same when treated with my fluroride-containing paste—either 2% or 0.1%—or with equivalent aqueous solutions of sodium fluoride. It was also demonstrated that the new fluoride of the extracted teeth thus treated with my dentifrice was incorporated in the surface of the enamel and was not held on the surface of the enamel by mechanical forces.

Myers et al., have shown recently that there is no statistically significant difference between the fluoride uptake by intact human teeth (teeth in the mouth) and extracted human teeth when treated with an aqueous solution of sodium fluoride [J. Dental Research 31, 743–750 (1952)]. The effectiveness of topical application of intact teeth with aqueous fluoride solutions in reducing tooth decay has been amply demonstrated over the past ten years. That fluoridization of intact human teeth is effective and safe in reducing dental decay is afforded by numerous publications of which the following are illustrative: J. R. Doty, J. A. D. A. 47, 203–5 (1953); an editorial entitled "Evidence favoring fluoridization continues to mount," J. A. D. A. 46, 576 (1953); Knutson et al., Pub. Health Rep. 61, 1683 (1946).

I claim:

1. A therapeutic dentifrice comprising approximately 0.1–2.0% by weight of a water-soluble, inorganic fluoride and about 25–95% by weight of microcrystalline aluminum hydroxide.

2. A therapeutic dentifrice paste comprising 0.1–2.0% by weight of sodium fluoride and 25–50% by weight of microcrystalline aluminum hydroxide.

3. A therapeutic dentifrice powder comprising 0.1–2.0% by weight of sodium fluoride and 90–95% by weight of microcrystalline aluminum hydroxide.

4. A therapeutic dentifrice paste comprising 0.1–2.0% by weight of stannous fluoride and 25–50% by weight of microcrystalline aluminum hydroxide.

5. A therapeutic dentifrice powder comprising 0.1–2.0% by weight of stannous fluoride and 90–95% by weight of mircrocrystalline aluminum hydroxide.

6. A therapeutic dentifrice liquid comprising 0.1–2.0% by weight of sodium fluoride and 25–30% by weight of microcrystalline aluminum hydroxide.

7. A therapeutic dentifrice paste comprising 0.1–2.0% by weight of sodium fluoride, 25–50% by weight of microcrystalline aluminum hydroxide and 5–20% by weight of a crystalline aluminum hydroxide having a particle size of about 5–30 microns.

8. A therapeutic dentifrice paste comprising approximately 2.0% by weight of sodium fluoride, approximately 25% by weight of microcrystalline aluminum hydroxide and approximately 4% by weight of alumina having a particle size of about 5–30 microns.

9. A therapeutic dentifrice paste comprising approximately 0.1% by weight of sodium fluoride, approximately 38% by weight of mircrocrystalline aluminum hydroxide and approximately 5% by weight of crystalline aluminum hydroxide having a particle size of about 5–30 microns.

References Cited in the file of this patent

UNITED STATES PATENTS

| 1,943,856 | Cross | Jan. 16, 1934 |
| 2,550,207 | Tainter | Apr. 24, 1951 |

FOREIGN PATENTS

| 3,034 | Great Britain | of 1914 |
| 260,995 | Switzerland | Nov. 14, 1945 |

OTHER REFERENCES

Bibby: Jour. Am. Dent. Assn., vol. 34, January 1947, pp. 26–32.

Dobbs: Jour. Am. Dent. Assn., vol. 31, 1944, pp. 832–842.

Sci. News Letter, Aug. 16, 1947, p. 110.

Lesser: Drug and Cos. Ind., 61:5, November 1947, pp. 611–613.

Jour. Am. Pharm. Assn., May 1948, pp. 314 and 316.
Jour. Am. Med. Assn., 137:13, July 24, 1948, p. 1177.
Jour. Am. Med. Assn., 135:5, pp. 319 and 320.

U. S. DEPARTMENT OF COMMERCE
PATENT OFFICE

CERTIFICATE OF CORRECTION

Patent No. 2,818,371                                December 31, 1957

George D. Wessinger

It is hereby certified that error appears in the printed specification of the above numbered patent requiring correction and that the said Letters Patent should read as corrected below.

Column 2, line 68, for "of fluoride" read -- of sodium fluoride --; column 4, line 61, for "fluroride" read -- fluoride --; column 5, line 23, for "mircrocrystalline" read -- microcrystalline --.

Signed and sealed this 25th day of March 1958.

(SEAL)

Attest:

KARL H. AXLINE                                        ROBERT C. WATSON

Attesting Officer                                    Commissioner of Patents